US006748448B1

United States Patent
Barrera et al.

(10) Patent No.: US 6,748,448 B1
(45) Date of Patent: Jun. 8, 2004

(54) HIGH PERFORMANCE INTERNET STORAGE ACCESS SCHEME

(75) Inventors: Clodoaldo Barrera, Morgan Hills, CA (US); Daniel Alexander Ford, Los Gatos, CA (US); Saugata Guha, Fremont, CA (US); Balakrishna Raghavendra Iyer, San Jose, CA (US); Jaishankar Moothedath Menon, San Jose, CA (US); Harsha Ramalingam, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/459,585

(22) Filed: Dec. 13, 1999

(51) Int. Cl.[7] .............................................. G06F 15/16
(52) U.S. Cl. ..................... 709/245; 709/217; 709/227; 709/229; 709/321; 710/315
(58) Field of Search ................................. 709/235, 217, 709/245, 227

(56) References Cited

U.S. PATENT DOCUMENTS

| | | |
|---|---|---|
| 5,530,703 A | 6/1996 | Liu et al. |
| 5,734,918 A | 3/1998 | Odawara et al. |
| 5,751,961 A * | 5/1998 | Smyk .......................... 709/217 |
| 5,774,660 A | 6/1998 | Brendel et al. |
| 5,852,717 A | 12/1998 | Bhide et al. |
| 5,867,648 A | 2/1999 | Foth et al. |
| 5,870,546 A | 2/1999 | Kirsch |
| 5,878,219 A | 3/1999 | Vance, Jr. et al. |
| 5,941,972 A * | 8/1999 | Hoese et al. .................. 710/315 |
| 6,098,125 A * | 8/2000 | Fiacco et al. ................. 370/235 |
| 6,167,453 A * | 12/2000 | Becker et al. ............... 709/245 |
| 6,199,112 B1 * | 3/2001 | Wilson ......................... 340/475 |
| 6,341,315 B1 * | 1/2002 | Arroyo et al. ............... 709/200 |
| 6,427,173 B1 * | 7/2002 | Boucher et al. ............. 709/230 |
| 6,453,350 B1 * | 9/2002 | Factor .......................... 709/226 |
| 6,519,626 B1 * | 2/2003 | Soderberg et al. ........... 709/203 |

FOREIGN PATENT DOCUMENTS

EP          1251439 A2 * 10/2002  ........... G06F/17/30

* cited by examiner

Primary Examiner—Ayaz Sheikh
Assistant Examiner—Syed A. Zia
(74) Attorney, Agent, or Firm—Timothy N. Ellis; Oppenheimer, Wolff & Donnelly LLP

(57) ABSTRACT

Systems and methods of increasing the performance of computer networks, especially networks connecting users to the Web, are provided. Performance is increased by reducing the latency the client experiences between sending a request to the server and receiving a response. A connection is obtained by a client device to the network target node addressed by a physical I/O address, to more quickly respond to requests for resource files on data storage devices. This enhancement may be implemented by connecting the controller of the data storage device directly to the network, to reduce the latency involved in mapping the logical I/O address into a physical I/O address. In that case the requested resource file is sent to the client directly by the data storage device controller, thus saving time otherwise spent in sending the request and data between computer network components.

31 Claims, 3 Drawing Sheets

HIGH PERFORMANCE INTERNET STORAGE ACCESS SCHEME

BACKGROUND OF THE INVENTION

1. Field of the Invention

The present invention is generally related to improving access to information resources on networked information server systems and, more particularly, to server systems and processes for efficiently addressing external servers, and hyperlink references, for purposes of improving access to information resources.

2. Description of Related Art

The recent substantial growth and use of the internationally connected computer network, generally known as the Internet, has largely been due to widespread support of the hypertext transfer protocol (HTTP). This protocol permits client systems connected through Internet Service Providers (ISPs) to access independent and geographically scattered server systems also connected to the Internet. Client side browsers, such as Netscape Mozilla and Navigator (Netscape Communications Corp.) and NCSA Mosaic, provide efficient graphical user interface based client applications, implemented in the client side portion of the HTTP.

The distributed system of communication and information transfer made possible by the HTTP is commonly known as the World Wide Web (WWW, Web). Internet Service Providers ("ISPs") provide Internet access to customers and their network access equipment is networked between the client computer running the browser and the Web server providing the Point of Presence ("POP") for the user. A subscriber to an online service typically accesses the service using special client-based communication software. This software establishes and manages a connection from the subscriber's computer to the service provider's host computers (usually a group of servers linked to a LAN or WAN) and facilitates the subscriber's interactions with the service.

The Web utilizes the HTTP client/server protocol, which is a request-response protocol. HTTP transactions include four stages: connection, request, response, and disconnection. In the connection stage, the client attempts to open a network connection to the server. Unless otherwise specified, HTTP attempts to use port 80 on the server for this connection. Establishing a connection involves one roundtrip time from the client to the server, as the client requests to open a network connection and the server responds that a network connection has been opened.

After a network connection is open, the client may send an HTTP request to the server in the request stage. A request stage involves one half of a round-trip time as the request goes from the client to the server. Once the server receives the request, the server responds by sending a response to the client in the response stage. As with the request, the response stage involves one half of a round-trip time as the response goes from the server to the client. The disconnection stage closes the network connection to the server. This stage involves one half of a round-trip time and may occur many different ways.

The World Wide Web makes hypertext documents available to users over the Internet. A hypertext document does not present information linearly, like in a book, but instead provides the reader with links or pointers to other locations so that the user may jump from one location to another. The hypertext documents on the Web are accessed through the client/server protocol of Hypertext Transport Protocol (HTTP).

These hyper-links often appear in the browser as a graphical icon or as colored, underlined text. A hyper-link contains a link to another Web page. Using a mouse to click on the hyper-link initiates a process which locates and retrieves the linked Web page, regardless of the physical location of that page. Hovering a mouse over a hyper-link or clicking on the link often displays in a corner of the browser a locator for the linked Web page. This locator is known as a Universal Resource Locator, or URL.

The URL is used for accessing resources on the Internet, such as hypertext mark up language (HTML) documents, images, sound files, database search engines, etc. The URL identifies a domain, a host within that domain, and sometimes a resource or file within a directory structure on the host computer. Domains can be thought of as a group of computers, such as all computers on a company's network. For example, the domain "ibm.com" identifies a domain for the commercial company IBM, which may include thousands of individual computers. Typically the URL identifies only those computers which are servers on the Web by prefixing the domain with a host name. Thus the URL "http://www.ibm.com" identifies an individual host computer(s) within the ibm.com domain which operates as a Web server for IBM, and can process the request embodied in the URL. The word HTTP tells the host to use the hyper-text transfer protocol while delivering files over the Internet. The files to be delivered can be provided from resources such as database queries or execution of scripts by the host, as well as traditional data files. There are other protocols that can be used on the Web, such as File Transfer Protocol (FTP).

From a client side user interface perspective, a system of uniform resource locators (URLs) is used to direct the operation of a Web browser in establishing transactional communication sessions with designated Web server computer systems. In general, each URL is of the basic form http://<server_name>.<sub-domain.top_level-domain>/<path>

The server name is typically "www" and the sub_domain.top-level_domain is a standard Internet domain reference. The path is an optional additional URL qualifier, which defines the location of the resources and usually contains a directory structure that leads to a particular file. The URL scheme of the Internet is flexible and adaptable, based on well-known conventions, so that application servers receive sufficient information to process a client request.

User's selection of a URL on the client side results in a transaction being established in which the client sends the server an HTTP message referencing a default or explicitly named data file constructed in accordance with the hypertext mark up language. This data file or Web page is returned in one or more response phase HTTP messages by the server, generally for display by the client browser. Additional embedded image references may be identified in the returned Web page resulting in the client browser initiating subsequent HTML transactions to retrieve typically embedded graphics files. A fully reconstructed Web page image is then presented by the browser through the browser's graphical user interface.

A Web server site may contain thousands of individual Web pages. The location of the file or resource containing a desired page is identified by appending a directory-path file name to the host and domain names in the basic URL to form a complete URL. Thus the URL "http://www.ibm.com/dira/dirb/dirc/intro.html" identifies a hyper-text markup-language file called "intro.html" which resides on a host named "www" within the ibm.com domain. The file resides in the dira directory, in its dirb/dirc subdirectory. Often this HTML file contains references to other files which are loaded automatically by the client's browser.

While the URL is used to locate a file on a host within a domain, it conventionally does not contain a physical address for the host computer. Addresses of computer machines on the Internet are specified using a 32-bit numeric identifier known as the Internet-Protocol (IP) address, assigned to each computer so that no two machines have the same IP address. The IP address is often written as four decimal numbers separated by periods. Each decimal number represents an 8-bit binary number, from zero to 255 in decimal notation. Thus a computer in IBM's domain might have the IP address 209.180.55.2 while another computer in that domain might have the address 209.180.55.103.

FIG. 1 illustrates a block diagram of a typical server system, having multiple computers networked over the Internet 12, with a series of high-speed communications links, which may be located between educational, research and commercial computer sites. The Internet computers utilize the Transmission Control Protocol/ Internet Protocol (TCP/IP) as the communications protocol which can network very diverse and dissimilar systems.

The server system contains a client computer 10, serving browser, and servers, such as server 14. Server 14 contains its own data storage device 20 with copies of data files, including requested file. Typically, client computer 10 browser initiates a communication session with the remote server 14 by the user selecting a URL, perhaps by mouse-clicking on a hyper-link to a new Web page. Browser imbeds requests and commands and a small amount of data in URL's, which are transmitted to the server 14. Each URL contains about 50 to 150 bytes of information. A URL often contains information other than a requested file description. For example, when the user of browser mouse-clicks on a bitmap image displayed on a Web page, the relative coordinates of the mouse's location when the mouse click occurred are also included in the URL: http://www.round.com/cgi-bin/coo.cgi? 102,315. Server 14 decodes the coordinates in the URL and determines where on the Web page the user mouse-clicked.

In conventional systems a host server name "www.round.com", with the URL "http://www.round.com/file.html", is typically sent to the domain-name-system (DNS) server, which is a special Internet server with a look-up table. DNS server is often a special server at an Internet Service Provider which contains most or all domain names on the entire Internet, or in a local region of the Internet. One DNS server may have to refer the request to another DNS server for unknown host-names.

DNS server looks through the look-up table and finds an entry for the host www.round.com. This entry contains a physical IP address for the Web-server host in the domain round.com. This IP address, such as 18 230.101.17.101, is returned to the client browser. Browser may then store this IP address in client computer cache for future use, a process known as browser caching of the IP address.

Browser then uses the IP address to initiate a communication session with the remote computer which physically has the desired Web page, such as the www.round.com server having the file.html file, in order to retrieve a file from a remote server. Once the session with server 14 is established, URL is sent to the server 14. Server 14 then accesses the data storage device 20 which includes requested file, the file.html Web page. A file copy of requested file is sent back to client browser, which re-constructs the Web page from file copy and displays the Web page on the client computer 10. Subsequently, other files may also be transferred, such as graphic image files which were not directly requested by the URL, but are referenced by the file.html file.

There is a significant amount of latency in conventional computer communication networks, occurring while the client waits for a response from the Web server. Accordingly, there is a need for systems and methods of increasing the performance of the computer networks, preferably without requiring modification of existing browsers. Performance may be increased by the network access equipment sending a resource file physical I/O address in a URL request to either a Web server or directly to a data storage device, thus by-passing some data storage device access layers, including the file I/O layer.

SUMMARY OF THE INVENTION

The foregoing and other objects, features, and advantages of the present invention will be apparent from the following detailed description of the preferred embodiments which makes reference to several drawing figures.

One preferred embodiment of the present invention includes a method of utilizing a universal-resource locator (URL) addressing scheme, by a client network access equipment, for efficiently accessing resource files on a data storage device attached to a networked server system. The method uses a client computer browser for sending a URL request for a resource file. The URL request includes the pre-resolved resource file physical I/O address, thereby eliminating some data storage device access procedures, like logical address mapping. The requested resource file is accessed on the data storage device directly, through the physical I/O address, and then transferred between the data storage device and the client network access equipment.

The URL request resource file physical I/O address is preferably embedded in the client computer browser page URL link, pre-establishing a correspondence between the browser page element and the resource file. In this invention the network may be the Internet, the client computer browser a World Wide Web browser, the server system a Web server, and the resource file a Web page. The Web page has selectable items, including hyper-text objects, and the hyper-text objects include the predetermined embedded URL link.

The other embodiment of the present invention is the system used with this method embodiment.

Yet another embodiment of the present invention is a method wherein the URL request is directly sent to the data storage device controller, without first sending a Hyper-Text Transfer Protocol (HTTP) request to a server. In the system embodiment of the present invention corresponding to this method embodiment, the data storage device controller is directly connected to the network and has a destination IP address, to allow accessing the requested resource file on the data storage device directly, and to allow the transfer of the requested resource file, between the data storage device and the client network access equipment, to be directly performed by the data storage device controller. The data storage device is preferably used with a SCSI or IDE controller protocol.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
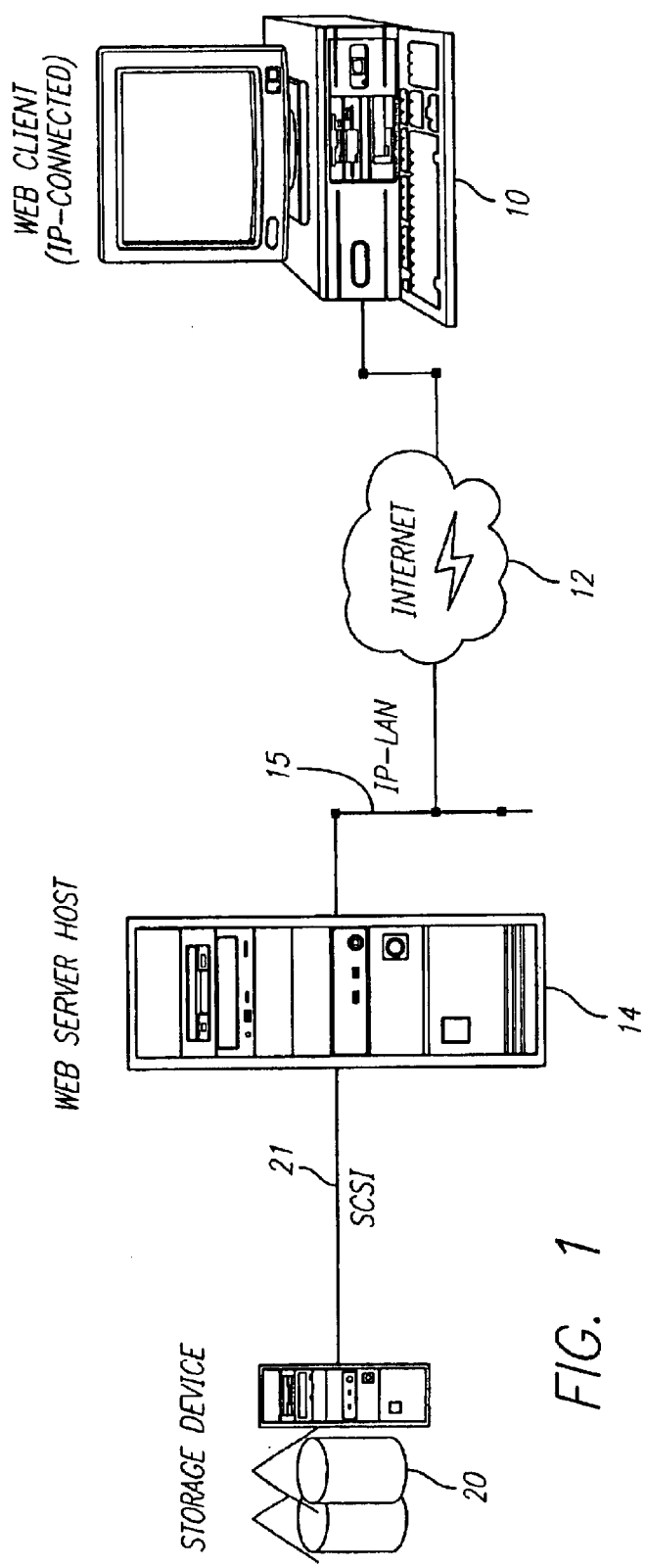
FIG. 1 illustrates a simplified block diagram of an exemplary preferred embodiment of the present invention showing an internet connection linking a Web client to a Web server.

In the following description of the preferred embodiments reference is made to the accompanying drawings which form the part thereof, and in which are shown by way of illustration specific preferred embodiments in which the invention may be practiced. It is to be understood that other embodiments may be utilized and structural and functional changes may be made without departing from the scope of the present invention.

In the following description numerous details are avoided because it is apparent to one skilled in the art that these specific details are not essential to the practice of the present invention. In particular, the present invention can readily be used in conjunction with a wide variety of data communication system components and networks, each network having its own unique protocol, bandwidth, and data transfer characteristics. It is further noted that well known network components are shown in block diagram form, in a number of figures, in order not to obscure the present invention unnecessarily.

As will be described, the preferred embodiments of the present invention disclose data communication system architectures and methods using a URL addressing scheme incorporating pre-resolved resource file physical I/O addresses, which results in by-passing some data storage device access layers, including the file I/O layer, which typically must perform logical address mapping. The disclosed access scheme speeds up access to static internet resources, because it accesses requested resource files on data storage devices directly, through their physical I/O addresses. In some preferred embodiments of the present invention this is accomplished by direct mapping of a URL to a physical I/O controller protocol, such as SCSI or IDE protocol.

Conventional data storage device data access layers include an application software layer, file I/O layer, and physical I/O layer. As noted above, the addressing scheme of the present invention bypasses the traditional Web server file I/O system layer. In some aspects of the present invention it even bypasses some other layers of the server network stack, including the server application software and file database. When the addressing scheme is used by the Web server, the server directly communicates with the storage I/O device controller to retrieve the resource file, thereby considerably speeding up internet access time for static content. Thus, use of a server file I/O system is an overhead and an unnecessary performance step which would prolong the response time for obtaining a static content of a resource file and therefore it is obviated in this invention.

The present invention may also be utilized in data communication systems with a heterogeneous Data. Management System (DMS), coupling server systems and mainframe systems from different vendors. The network connectivity scheme allows coupling to diverse processors, such as IBM, non-IBM and IBMPCMs, via standard widely adopted interfaces, such as Server Net, SCSI, PCI, ISA, Fibre Channel, ATM, EISA, and buses MCA, VME, S-BUS, etc.

Data storage device used in the present invention is preferably using a SCSI interface. The industry standard Small Computer System Interface (SCSI) has been used by conventional network connectivity schemes to connect server systems with SCSI controllers to mainframe systems so that data may be transferred therebetween. Such connectivity schemes connect an input/output channel of a mainframe system to a SCSI interface of a server system. Thus, the industry standard SCSI interface provides for heterogeneous, physical coupling of server systems to mainframe systems.

As mentioned above, FIG. 1 illustrates, in a form of a simplified block diagram, a typical computer communication network, usable in an exemplary preferred embodiment of the present invention, and showing an internet connection 12 linking a Web client 10 to a Web server 14, via LAN connection 15. As in all other preferred embodiments of the present invention, the client uses a client computer 10 browser to reach the Web server 14. The browser may be executed on a personal computer 10. The server 14 is typically a much more powerful system, including faster subsystems and more storage capacity.

According to the preferred embodiments of the present invention, when a Web page or other data file is initially saved or updated in a Web server data storage system 20, in a form of a resource file, a URL address link is prepared by a Web server host 14 and saved in an address table. The table has an indication of each data resource (such as an HTML Web page) file name, and its complete URL address, containing a physical I/O address of the resource file on a network node.

Each selectable item on Web pages displayed on a Web site has an embedded URL address, with the physical I/O address of the corresponding Web page file located on its data storage device 20, preferably a SCSI device with a connection 21 to the server 14. Therefore, when a Web page is served by the Web server 14 to the client 10, the client browser can send to the Web server 14 a request with a complete URL link to a selectable Web page, including its physical I/O address. Thus, the request can be passed by the server 14 directly to the data storage device 20 controller, avoiding the file I/O layer.

Selection of this embedded URL through the client browser of the client computer system 10 results in an HTTP transaction with the server 14. A client requests a connection with a server 14 and a session is set up between the client 10 and a server 14 at the Web site. In Internet applications the data packets received from the client are TCP/IP packets having a destination IP address of the assigned server node. The information stored in the embedded URL is then sent to the Web server 14.

Figure 2:
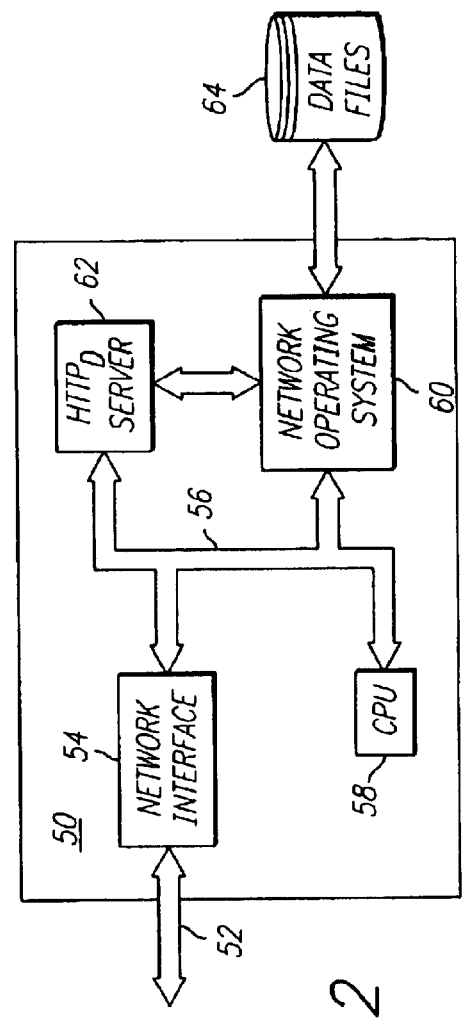
FIG. 2 illustrates a simplified block diagram of a server system, usable in the present invention

As shown in FIG. 2, the server system 50 receives the request information via a network connection 52 to a network interface 54 within the server system 50. The network interface 54 is coupled through an internal bus 56 to a central processing unit (CPU) 58. The CPU 58 executes a network operating system 60 in support of the network interface 54 and other functional aspects of the server system 50. The network operating system 60 supports the execution by the CPU 58 of an HTTP server application 62 that defines the responsive operation of the server system 50 to HTTP requests received via the network 52. The network operating system 60 provides access to temporary and persistent storage of data in mass storage devices 64, preferably the conventional hard disk or tape drive systems.

In accordance with the preferred embodiment of the present invention, the embedded information provided as part of a URL HTTP request is processed by the HTTP server 62. In one aspect of the embodiment, the processing of the HTTP request is performed through the execution of a host-based Common Gateway Interface (CGI) utility or the like. CGI script utility receives incoming URL from the client, which contains a request for a resource, and parses and decodes the URL request to obtain, among other data, a requested resource file physical I/O address. The CGI utility permits generally small programs to be executed by a server in response to a client URL request. The HTML Web page definition provides for the embedding of a specific HTML reference that will specify execution of a server CGI program as part of the process of the client Web browser reconstructing an image of a served Web page. Preferably, instead of using the CGI script utility, the parsing and decoding of the URL request is performed in a special, simplified and optimized, software routine, written in a language like C++, and embedded in the server system.

The physical I/O address of the embedded URL specifies the location of the requested target of a transaction, as specified by the client system 10 of FIG. 1. The remaining URL information is provided to the targeted data storage device 20, and sent to its device driver. The target device then selects the requested resource file to be transmitted to the client. The encoded URL provides address information regarding the client system 10 that submitted the request, so that the requested resource can be sent to the client.

As each client request is sent to the device driver corresponding to the selected data storage device, the request is examined to determine whether the request specifies a valid physical I/O address of an existent local Web page. If the Web page does not exist or, based on the client identification data provided via the HTTP in connection with the URL client request, the particular client is not permitted access to the existent Web page, the HTTP server 14 determines an appropriate error or denial access message that is returned to the client computer system 10. Otherwise, the HTTP server 14 proceeds and serves the requested Web page to the client computer system 10.

In a conventional system, when a resource file is transferred between computers via the Internet, a TCP/IP (Transmission Control Protocol/Internet Protocol) and an FTP (File Transfer Protocol) are generally used, according to the following steps:

1. Web client logs on to the Web through an Internet Service Provider (ISP);
2. The client selects a URL corresponding to a specific static page item, defining a resource file location on a data storage device connected to the Web server host;
3. Web server host receives an HTTP request (typically on port 80) from the client;
4. Host listener demon processes the request, by invoking the CGI script that parses and decodes the URL request;
5. CGI script identifies the resource file from the URL and requests the file I/O system mapping for the resource file;
6. File I/O system determines the physical I/O address of the resource file on the data storage device;
7. File I/O system makes an I/O request (typically to a SCSI or IDE controller) to retrieve the resource file;
8. Upon receiving the resource file from the file I/O system, the resource file is sent to the Web client using HTTP.

According to this preferred embodiment of the present invention only the following, reduced number of steps is needed, when a physical I/O address is sent in the complete URL address:

1. Web client logs on to the Web through an Internet Service Provider (ISP);
2. The client selects a URL corresponding to a specific static page item, defining a resource file location on a data storage device connected to the Web server host;
3. Web server host receives an HTTP request (typically on port 80) from the client;
4. Host listener demon processes the request, by invoking the CGI script or a special software routine that parses and decodes the URL request;
5. CGI script or the special software routine identifies the physical I/O address of the resource file from the URL and passes the request directly to the data storage device controller, thus avoiding the file I/O system;
6. Upon receiving the resource file, the host sends the resource file to the Web client using HTTP.

In this preferred embodiment of the present invention a URL address has the following content, assuming contiguous storage of resource file blocks:

http://.....<IP Address or Hostname of Controller>/<LUN#>/<StartBlock#>,<NumberOfBlocks>

In the disclosed preferred embodiment, the URL identifies a specific data storage device controller and its logical unit number, a physical block start address of the resource file on the data storage device and a number of blocks used for the resource file, and thus step 6 of a conventional system is bypassed. For faster data transfer another identifier, the number of bytes in the last block, can be added to the URL address, so that, in the last block transfer, only the bytes belonging to the requested Web page are transferred. Furthermore, this embodiment is not limited to the use of the block I/O addressing, by the block number and number of bytes, but can include any other manner of supplying the physical I/O address of the data storage device location and total number of bytes to be transferred.

In this aspect, the I/O request is made directly to the data storage device by the host CGI script or the or special software routine, significantly speeding up the data transfer transaction. Therefore, in this preferred embodiment of the present invention a server assists in high speed transfers of resource files between a magnetic disk or other storage media and a network, but the processing time for the file transfers is shortened by bypassing the file I/O system.

Figure 3:
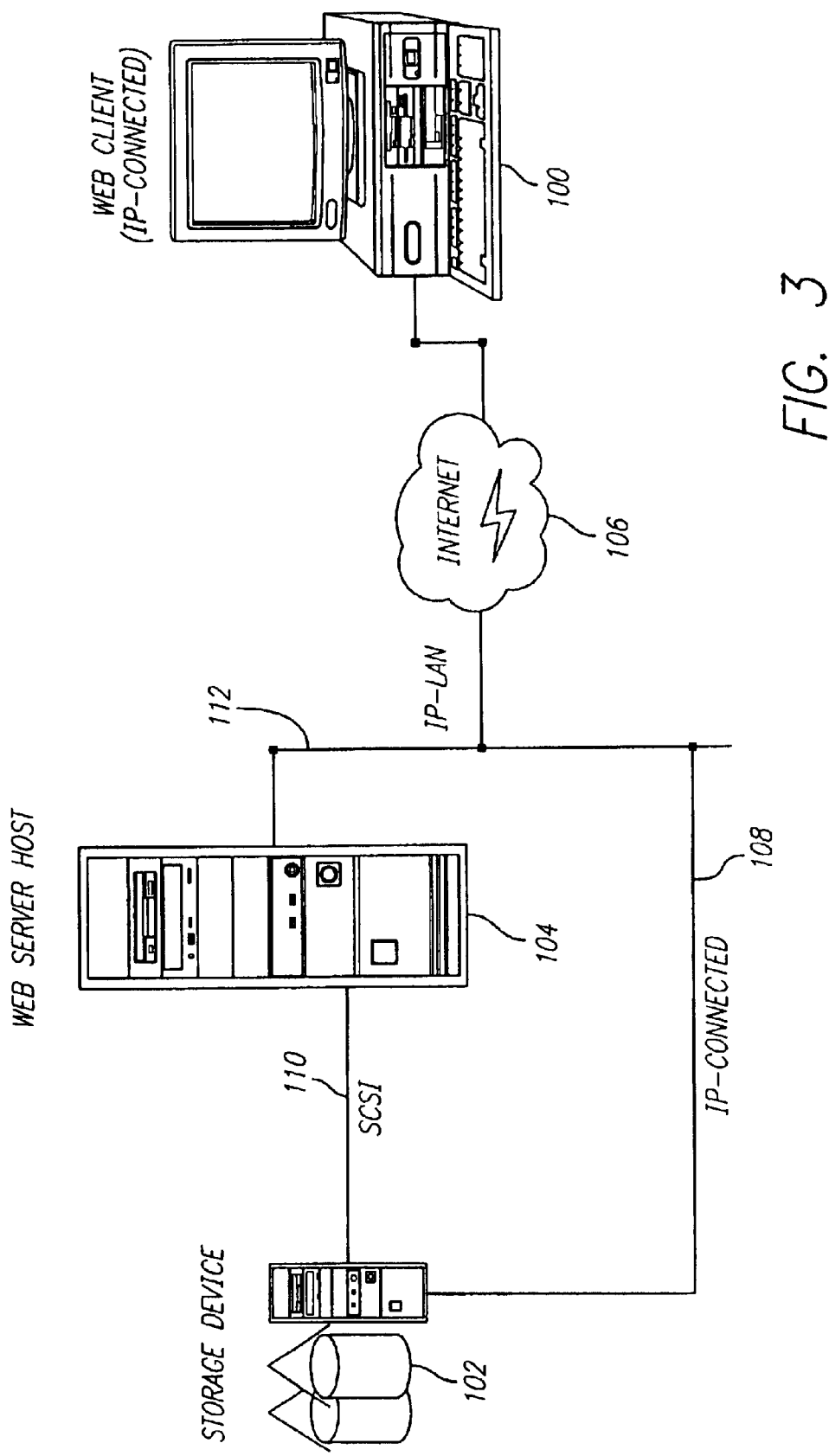
FIG. 3 illustrates a simplified block diagram of an exemplary preferred embodiment of the present invention where the function of returning the resource file to the client is directly performed by the data storage device controller.

In another preferred embodiment of the present invention, shown in FIG. 3, the function of returning the resource file to the client 100 is directly performed by the data storage device controller 102, and a URL includes a physical I/O address of a resource file. In this aspect of the invention the resource file is sent directly to the requesting client, without use of a server 104. For this purpose the data storage device controller 102 protocol, such as SCSI or IDE protocol is used and the data storage device controller 102 is directly connected, via connection 108 and LAN connection 112, to the internet 106, and has its own IP address.

According to this preferred embodiment of the present invention only the following, reduced number of steps is needed, when a physical I/O address is included in the complete URL address:

1. Web client logs on to the Web through an Internet Service Provider (ISP);
2. The client selects a URL corresponding to a specific static page item, defining a resource file location on a data storage device connected to the Web server host;
3. Data storage device controller receives the URL request from the client, using the data storage device controller protocol;
4. Data storage device controller invokes the CGI script or a special software routine, stored on the controller, that parses and decodes the URL request;
5. CGI script or the special software routine identifies the physical I/O address of the resource file from the URL and passes the request directly to the data storage device driver, using SCSI or IDE protocol for direct retrieval of I/O blocks;
6. Controller returns the resource file directly to the Web client using HTTP.

For faster data transfer another identifier, the number of bytes in the last block, can be added to the URL address, so that, in the last block transfer, only the bytes belonging to the requested Web page are transferred. Furthermore, this embodiment is not limited to the use of the block I/O addressing, by the block number and number of bytes, but can include any other manner of supplying the physical I/O address of the data storage device location and total number of bytes to be transferred.

In this preferred embodiment of the present invention, the host server 104 and the stack are bypassed. The data storage device controller 102 incorporates the Web network interface to interpret the request and return the requested resource file. In this embodiment the data storage device controller 102 also has embedded the CGI script utility or the special software routine, used to decode the request and obtain the client's IP address.

In this preferred embodiment of the present invention a URL address for the SCSI controller protocol has the following content, assuming contiguous storage of resource file blocks:

SCSI://<IP Address or Hostname of Controller>/<LUN#>/<StartBlock#>,<NumberOfBlocks>

A URL address for the IDE controller protocol has the following content, assuming contiguous storage of resource file blocks:

IDE://<IP Address or Hostname of Controller>/<LUN#>/<StartBlock#>,<NumberOfBlocks>

As mentioned above, according to the present invention, when data is transferred directly to the client from the data storage device controller 102, without help of a server 104, a file can be transferred at high speed, so that time required for the file transfer process can be shortened.

In this preferred embodiment the data storage device driver software is invoked by the controller's CGI script or the special software routine to perform the input/output operation at the computer system data storage device interface hardware. The interface hardware may be any data storage device controller including SCSI Host Adapter, IDE Adapter, Asynchronous Transfer Mode ("ATM"), Fibre Channel or ServerNet network interface adapter. Accordingly, the high speed input/output interface hardware may use the protocol for SCSI, ATM, Fiber Channel, ServerNet et al. As mentioned above, in this aspect of the invention the server network stack, which uses the protocol for TCP/IP or SNA, is not used.

Further, the preferred embodiments of the present invention are not limited to any version of HTTP, or to HTTP specifically, and are usable with any network type. While a connection through the public internet (such as Internet and WWW) has been described, the connection could also be made through private networks, such as corporate networks known as intranets and LANs. An intranet is just a subset of the larger internet. Thus the Web site could be behind a corporate firewall and not be visible to the users of the internet.

Moreover, although the invention is described for read operation, the request in a URL may include other commands, such as write, fetch, insert, update, or delete data, and may specify a physical I/O address of data on any type of data storage device, including a memory storage device. When data is to be written, a command such as PUT DATA may used. For reading the data file a command such as GET DATA may be used. The physical I/O address may also be dynamically generated and stored in the address table, to be obtained by the write operation.

Figure 4:
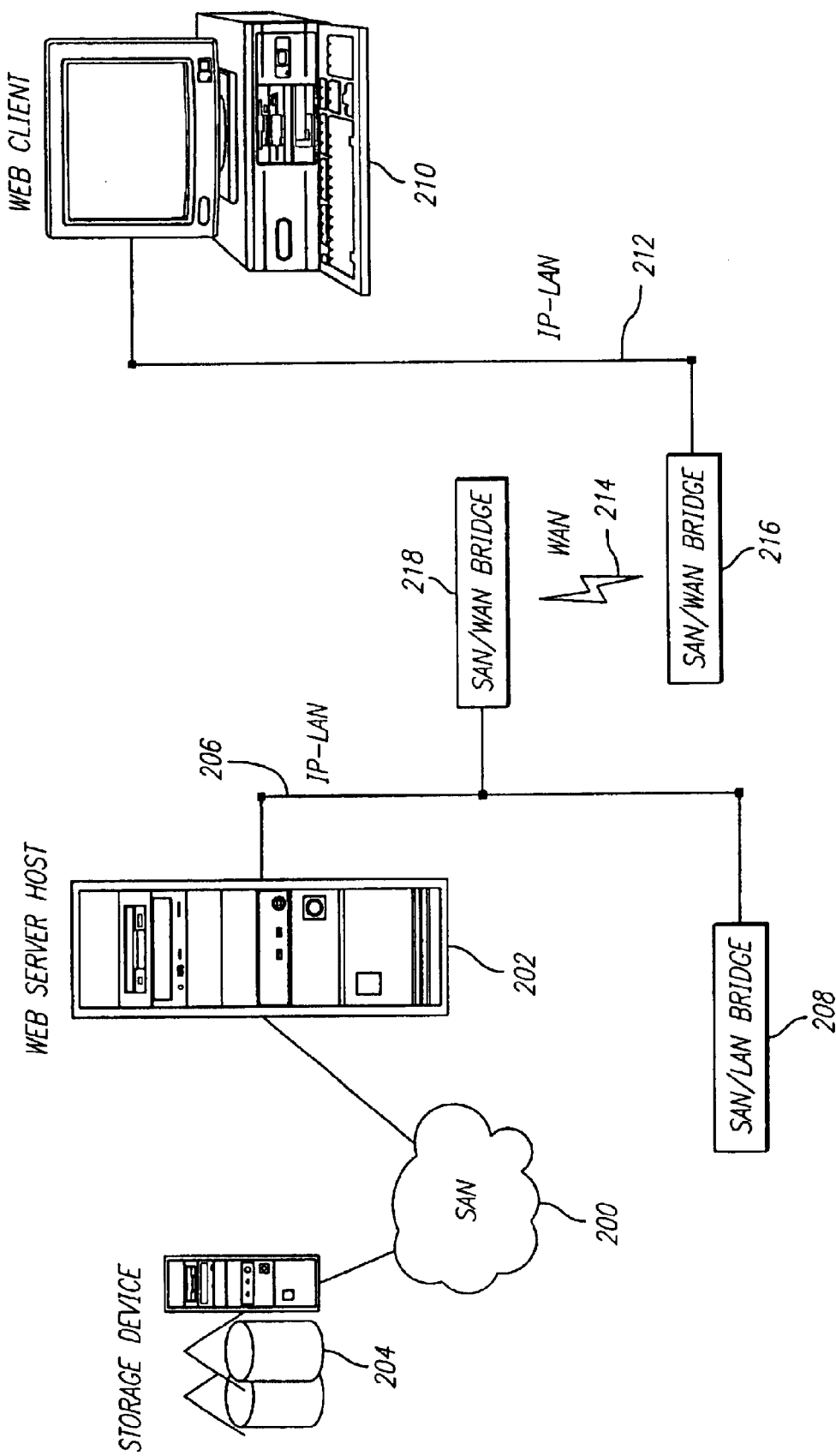
FIG. 4 illustrates a block diagram of an exemplary data communication system incorporating Storage Area Network (SAN) and Fibre Channel (FC) technology, according to the present invention.

In yet another preferred embodiment of the present invention a different type of internet is used, as shown in FIG. 4. It includes Storage Area Network (SAN) 200, for connecting the Web server host 202 and storage device 204. Server 202 is preferably connected with other similar servers over a LAN, and thus needs a SAN/LAN bridge 208 to the SAN 200. It preferably utilizes Fibre Channel (FC) technology, with Fibre Channel protocol. Web client 210 may also be on a client LAN 212, connected to the LAN 206 via WAN 214, thus needing SAN/WAN bridges 216, 218. The data storage device 204 is preferably attached to the FC-SAN 200 and the data storage device IP address on Fibre Channel is used for access. In this preferred embodiment the physical I/O address of the resource file is included in the URL, to provide the same kind of direct access as shown in other preferred embodiments of the present invention.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system utilizing a universal-resource locator (URL) addressing scheme for efficiently accessing resource files on a data storage device attached to a networked server system, comprising:

a network interface for receiving from a client computer browser across a network a URL request for a resource file, wherein the URL request as sent by the client browser includes a pre-resolved resource file physical I/O address;

a data storage device adapted to be operatively connected to said interface, wherein said requested resource file on said data storage device is accessed directly, through said physical I/O address;

wherein said requested resource file is adapted to be transferred between said data storage device and client network access equipment operatively connected to said networked server.

2. The system according to claim 1, wherein the URL request has the following fields:

protoc://...<IP Address or Hostname of Controller>/<LUN#>/<StartBlock#>,<NumberOfBlocks> specifying a transfer protocol type, a data storage device controller and logical unit number thereof, and a physical block start address and number of blocks used for the resource file on the data storage device.

3. The system according to claim 1, wherein the resource file physical I/O address in the URL request is predetermined in advance at creation of the resource file.

4. The system according to claim 3, wherein the URL request resource file physical I/O address is embedded in a client computer browser page URL link, pre-establishing a correspondence between a browser page element and said resource file.

5. The system according to claim 4 wherein said network comprises the Internet, the client computer browser comprises a World Wide Web browser, said server system comprises Web servers, said resource file including a Web page, and wherein said Web page has a selectable item including a hyper-text object, said hyper-text object including said pre-determined embedded URL link.

6. The system according to claim 1, wherein:

a server computer serves a browser display page, said browser display page including selectable page items with at least one embedded URL link to at least one other selectable display page on the data storage device, wherein each said embedded URL link includes a physical I/O address of the resource file on the data storage device;

said server receives said URL request, said URL request including said embedded URL link.

7. The system according to claim 1, wherein:
said URL request is parsed and decoded to obtain said requested resource file physical I/O address, and passes said URL request directly to said data storage device controller, thereby avoiding a file I/O system.

8. The system according to claim 1, wherein a networked server directly communicates with said data storage device controller to retrieve said resource file, thereby considerably speeding up network access time, and wherein said URL request has the following fields:

http://...<IP Address or Hostname of controller>/<LUN#>/<StartBlock#>,<NumberOfBlocks> specifying a Hyper-Text Transfer Protocol (HTTP) type, a data storage device controller and logical unit number thereof, and a physical block start address and number of blocks used for the resource file on the data storage device.

9. The system of claim 1, wherein:
said data storage device controller is directly connected to said network, said data storage device having a destination IP address within said network;
said URL request is sent directly to said data storage device controller without a Hyper-Text Transfer Protocol (HTTP) containing said URL request being sent to a server;
said URL is directly mapped to a physical I/O controller protocol; and
said requested resource file is directly transferred to said network for use by said client network access equipment without said requested resource file being routed through said server.

10. The system according to claim 9, wherein the data storage device includes a Small Computer System Interface (SCSI), and wherein said URL request has the following fields:

SCSI://<IP Address or Hostname of Controller>/<LUN#>/<StartBlock#>,<NumberOfBlocks> specifying a SCSI protocol type, a data storage device controller and logical unit number thereof, and a physical block start address and number of blocks used for the resource file on the data storage device.

11. The system according to claim 9, wherein said data storage device includes an IDE controller and the URL request, said URL request having the following fields:

IDE://<IP Address or Hostname of Controller>/<LUN#>/<StartBlock#>,<NumberOfBlocks> specifying an IDE Protocol type, a data storage device controller and logical unit number thereof, and a physical block start address and number of blocks used for the resource file on the data storage device.

12. The system according to claim 1, wherein said network comprises Storage Area Network (SAN) with Fibre Channel (FC) technology.

13. A computer readable medium containing software code for causing a server to send a browser page including a pre-resolved resource file physical I/O address to a client computer, such that a data storage device having an assigned target node adapted for accessing a requested resource file on said data storage device directly, through the physical I/O address of the resource file, can transfer the requested resource file between the data storage device and client network access equipment without having to perform an address mapping step in order to resolve the resource file physical I/O address.

14. The computer readable medium according to claim 13, wherein the URL request has the following fields:

protoc://...<IP Address or Hostname of controller>/<LUN#>/<StartBlock#>,<NumberOfBlocks> specifying a transfer protocol type, a data storage device controller and logical unit number thereof, and a physical block start address and number of blocks used for the resource file on the data storage device.

15. The computer readable medium according to claim 13, wherein the resource file physical I/O address in the URL request is pre-determined in advance, during the resource file creation.

16. The computer readable medium according to claim 15, wherein the URL request resource file physical I/O address is embedded in a client computer browser page URL link, pre-establishing a correspondence between said browser page element and the resource file.

17. The computer readable medium according to claim 16, wherein the network comprises the Internet, the client computer browser comprises a World Wide Web browser, the server comprises a Web server, the resource file including a Web page, and wherein said Web page has a selectable item including a hyper-text object, said hyper-text object including said pre-determined embedded URL link.

18. The computer readable medium of claim 13, wherein said computer readable medium further includes:
software code for setting up a session between client network access equipment and said assigned target node for servicing requests from clients;
software code for serving a browser display page including a selectable page item with an embedded URL link to at least one other selectable display page on the data storage device, wherein each said URL link includes a physical I/O address of the resource file on the data storage device; and
software code for receiving at the server a page item selected by a client with the embedded URL link as the URL request to the server system.

19. The method according to claim 13, wherein the client computer browser:
making a connection and setting up a session between the client network access equipment and the assigned target node for servicing requests from clients,
serving a browser display page including selectable page items with embedded URL links to other selectable display pages on the data storage device, wherein each said URL link including a physical I/O address of the resource file on the data storage device, and
sending a selected page item with the embedded URL link as the URL request to the server system.

20. The computer readable medium according to claim 13, wherein the assigned target node:
receives the URL request from the client computer browser;
parses and decodes the URL request to obtain the requested resource file physical I/O address; and
passes the URL request directly to the data storage device controller, thereby avoiding the file I/O system.

21. The computer readable medium according to claim 13, wherein the assigned target node directly communicates with the data storage device controller to retrieve the resource file, thereby considerably speeding up the network access time, and wherein said URL request has the following fields:

http://...<IP Address or Hostname of controller>/<LUN#>/<Start-Block#>,<NumberOfBlocks> specifying a Hyper-Text Transfer Protocol (HTTP) type, a data storage device controller and logical unit number thereof, and a physical block start address and number of blocks used for the resource file on the data storage device.

22. The computer readable medium according to claim 13, wherein the assigned target node includes the data storage device controller being directly connected to the network and having a network destination IP address, whereby the client network access equipment may issue the URL request directly to the data storage device controller without first sending a Hyper-Text Transfer Protocol (HTTP) request to a server, for accessing the requested resource file on the data storage device directly, by mapping the URL to a physical I/O controller protocol, and wherein transferring the requested resource file between the data storage device and the client network access equipment is directly performed by the data storage device controller.

23. The computer readable medium according to claim 22, wherein the data storage device includes a Small Computer System Interface (SCSI) and the URL request has the following fields:

SCSI://<IP Address or Hostname of Controller>/<LUN#>/<Start-Block#>,<NumberOfBlocks> specifying a SCSI protocol type, a data storage device controller and logical unit number thereof, and a physical block start address and number of blocks used for the resource file on the data storage device.

24. The computer readable medium according to claim 22, wherein the data storage device includes an IDE controller and the URL request having the following fields:

IDE://<IP Address or Hostname of Controller>/<LUN#>/<Start-Block#>,<NumberOfBlocks> specifying an IDE Protocol type, a data storage device controller and logical unit number thereof, and a physical block start address and number of blocks used for the resource file on the data storage device.

25. The computer readable medium according to claim 13, wherein the network comprises a Storage Area Network (SAN) with Fibre Channel (FC) technology.

26. A computer readable memory containing software code capable of causing a server computer to send a message including a hyper-text object to a client across a network, said message including a resource file physical I/O address associated with said hyper-text object, said resource file physical I/O address pointing to a resource file on a data storage device operatively connected to said network without requiring said resource file to be routed through said server.

27. The computer readable memory of claim 26 wherein said resource file physical I/O address is embedded within said hyper-text object.

28. The computer readable memory of claim 26 wherein said network is the Internet, said message is in a hyper-text markup language (HTML) message, and said resource file physical I/O address is embedded within said hyper-text object.

29. The computer readable memory of claim 26 wherein said message is a first HTML browser page which includes said hyper-text object, and said resource file physical I/O address is embedded within said hyper-text object.

30. The computer readable memory of claim 29 wherein said resource file is second HTML browser page.

31. A computer readable memory containing programming code capable of causing a first computer operatively connected to a local area network (LAN) which in turn is operatively connected to both a data storage device and a wide area network (WAN), to send a message across said WAN to a second computer;

said message including a pre-resolved resource file physical I/O address such that said second computer can request a file from said data storage device using said pre-resolved resource file physical I/O address, said requested file being thereafter transferred from said data storage device to said second computer without being routed through said server.

* * * * *